C. H. BASSETT.
Copings and Coverings for Graves.
No. 207,155. Patented Aug. 20, 1878.
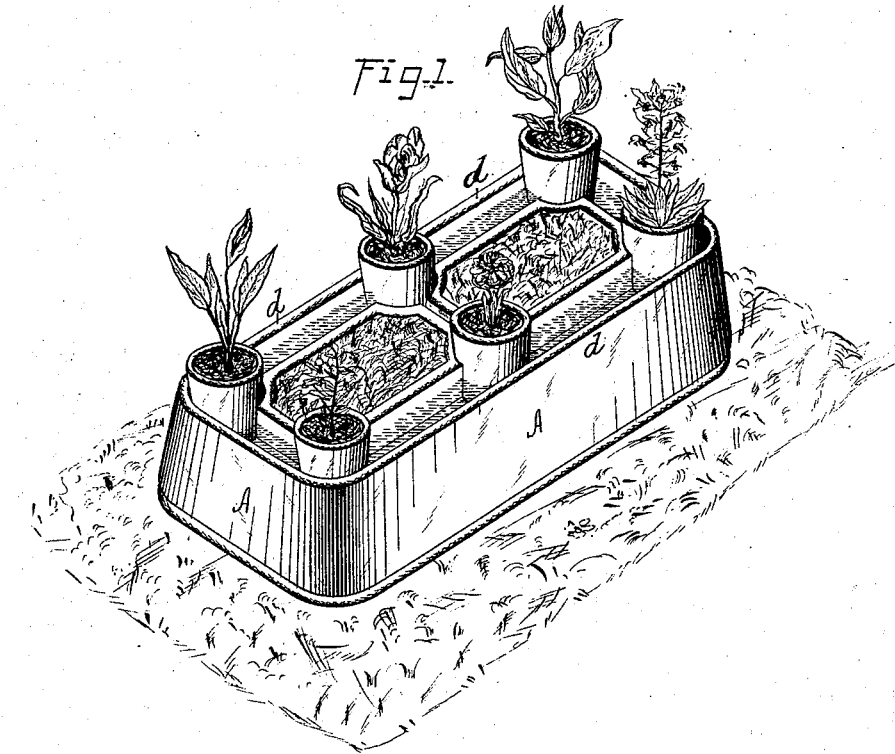
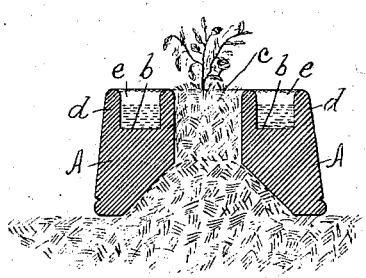
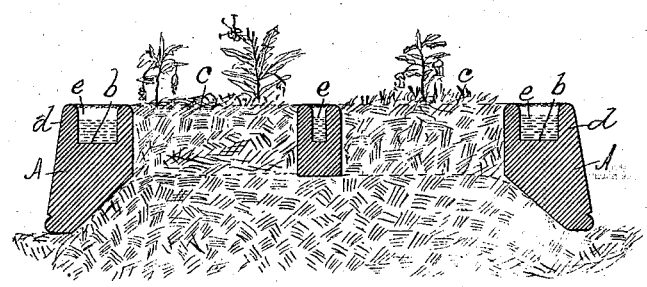
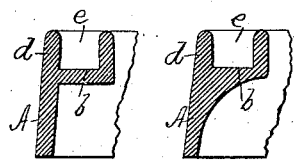
WITNESSES:
Jas. E. Hutchinson
Penn Halsted
INVENTOR.
Charles H. Bassett
By John J. Halsted
his Atty.

UNITED STATES PATENT OFFICE.

CHARLES H. BASSETT, OF DERBY, CONNECTICUT.

IMPROVEMENT IN COPINGS AND COVERINGS FOR GRAVES.

Specification forming part of Letters Patent No. 207,155, dated August 20, 1878; application filed June 10, 1878.

*To all whom it may concern:*

Be it known that I, CHARLES H. BASSETT, of Derby, in the county of New Haven and State of Connecticut, have invented certain new and useful Improvements in Copings or Coverings for Graves; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention consists of a durable inclosure of special construction, adapted to be placed around and partially to cover the mound of a grave, and provided with a water-retaining channel adapted to hold flower-pots.

Figure 1 is a perspective view of my improved device as placed over the mound or grave; Figs. 2 and 3, a cross-section and a longitudinal vertical section of the same; and Fig. 4, fragmentary views, showing a slight variation in form.

The small mounds of earth indicating a grave are usually covered with grass, and by reason of their form are not well protected against being defaced or more or less broken away at their top and sides by the feet of pedestrians, or of being washed away by rains or broken by frosts, thaws, &c.; nor are they well adapted to properly support plants or flower-pots which bereaved friends are apt to place upon them, and their usually sloping sides shed the rain too freely to give proper moisture to the roots of such flowers and plants.

I therefore provide a wall or high coping, A, which may be made in a single piece, and either of plastic material or of metal, stone, or other suitable durable material capable of exposure to the weather, adapting it in size to be placed over, and to thus more or less cover, the top, as well as to entirely surround the grave, and of any desired ornamental shape. This coping is hollow or bottomless on its under side, so that it may permit the mound or hillock of the grave to occupy this hollow space; and it has a horizontal part or partial partition, $b$, near its top line, and in this partition are walled openings $c$, of tasteful or geometric shape, thus affording between such inner walls and the outer wall, $d$, a channel, $e$, without any outlet, and capable of holding a moderate quantity of rain or other water; and this channel is intended and adapted in shape for receiving flower-pots, as shown in Fig. 1, or for receiving cut flowers, bouquets, &c., and keeping them fresh; and the pots may be permanently secured to place or be removable.

It will now be readily seen that, when this cover is applied properly to the earthy mound of a grave, that part of its outer wall which is below the line of the channel $b$ prevents the mound from falling away, and preserves it complete; that the top of the mound may be made and kept flat or horizontal, though the sides may be vertical, or nearly so, and thus there is a larger available surface for planting in the open spaces $c$ of the partition; that the earth of the mound is kept moister by reason of its incasement, and that the plants consequently will flourish better, while at the same time they can take deeper root and a more permanent hold on the soil; that the cut flowers and plants in the pots may have a good supply of moisture from the channel $e$; and that the plants, as well as the grave, are well protected against the usual risks of damage.

I claim—

1. A grave-protector consisting of a continuous wall, A, adapted in size and form to surround the earthy mound, and having at its top a walled channel, $e$, adapted to hold water and afford level support for flower-pots, substantially as described.

2. The grave-protector described, as made with the boundary wall A, partial partition $b$, openings in said partition, and a walled channel, $e$, all as set forth.

CHAS. H. BASSETT.

Witnesses:
CHAS. E. CLARK,
WM. S. BROWN.